United States Patent
Lakhdhir (10) Patent No.: US 6,934,734 B2
(45) Date of Patent: Aug. 23, 2005

(54) METHOD AND APPARATUS FOR MANAGING AND PRESENTING CHANGES TO AN OBJECT IN A DATA PROCESSING SYSTEM

(75) Inventor: Mansoor Abdulali Lakhdhir, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 09/730,407

(22) Filed: Dec. 4, 2000

(65) Prior Publication Data

US 2002/0069266 A1 Jun. 6, 2002

(51) Int. Cl.⁷ .............................................. G06F 15/16
(52) U.S. Cl. ........................ 709/202; 345/619; 345/11
(58) Field of Search ................................ 709/219, 202; 725/109; 345/705, 804, 634, 733, 782, 758, 744, 619, 11

(56) References Cited

U.S. PATENT DOCUMENTS

| 5,499,327 A | * | 3/1996 | Satoh ......................... 345/634 |
| 5,734,380 A | * | 3/1998 | Adams et al. ............... 345/804 |
| 5,812,125 A | * | 9/1998 | Wilkinson ................... 345/733 |
| 6,297,822 B1 | * | 10/2001 | Feldman ...................... 345/705 |
| 6,577,330 B1 | * | 6/2003 | Tsuda et al. ................ 345/782 |
| 6,630,944 B1 | * | 10/2003 | Kakuta et al. .............. 345/758 |
| 6,738,077 B1 | * | 5/2004 | Wendker et al. ............ 345/744 |
| 2002/0007493 A1 | * | 1/2002 | Butler et al. ................ 725/109 |

* cited by examiner

Primary Examiner—Le Hien Luu
(74) Attorney, Agent, or Firm—Duke W. Yee; Diana R. Gerhardt; Francis Lammes (57) ABSTRACT

A method, apparatus, and computer implemented instructions for presenting changes to data are provided. User input is received through a first program in a first instance of a browser. The user input is placed in a variable. The user input is retrieved from the variable through a second program. The user input is processed by the second program to form a result. The result is presented in a second instance of the browser.

23 Claims, 6 Drawing Sheets

METHOD AND APPARATUS FOR MANAGING AND PRESENTING CHANGES TO AN OBJECT IN A DATA PROCESSING SYSTEM

BACKGROUND OF THE INVENTION

1. Technical Field

The present invention relates generally to an improved data processing system, and in particular to a method and apparatus for processing data in a data processing system. Still more particularly, the present invention relates to a method and apparatus for managing and presenting changes to a graphical object displayed in a graphical user interface.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways; that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name server (DNS), which is a service that translates the symbolic name entered by the user into an IP address by looking up the domain name in a database.

The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded. Java is an object oriented programming language and environment focusing on defining data as objects and the methods that may be applied to those objects. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

Currently, users are required to enter input in a first page with the input then being sent to a server. A result is returned from the server and displayed as a second page. In some cases, the input is processed by an applet locally, but the applet presents one graphical user interface (GUI) for receiving a user input. When the user input is processed, another GUI is displayed in place of the first one. Oftentimes, the user would like to be able to visualize and see changes to the object as the changes are being made. For example, if a customer is buying an automobile, the customer would like to be able to select the model, color, interior, and other options as the selections are being made.

Therefore, it would be advantageous to have an improved method and apparatus for presenting changes to an object.

SUMMARY OF THE INVENTION

The present invention provides a method, apparatus, and computer implemented instructions for presenting changes to data. User input is received through a first program in a first instance of a browser. The user input is placed in a variable. The user input is retrieved from the variable through a second program. The user input is processed by the second program to form a result. The result is presented in a second instance of the browser.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
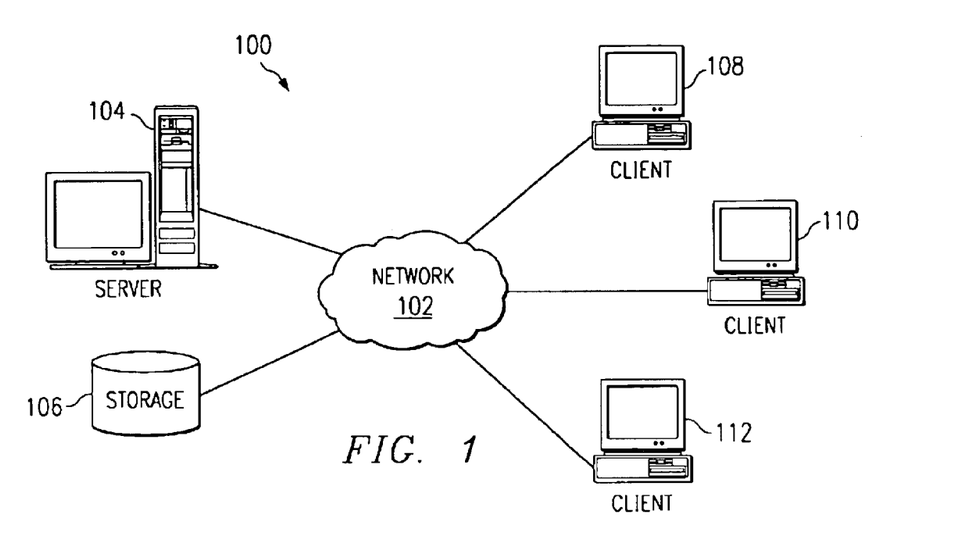
FIG. 1 is a pictorial representation of a network of data processing systems in which the present Invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
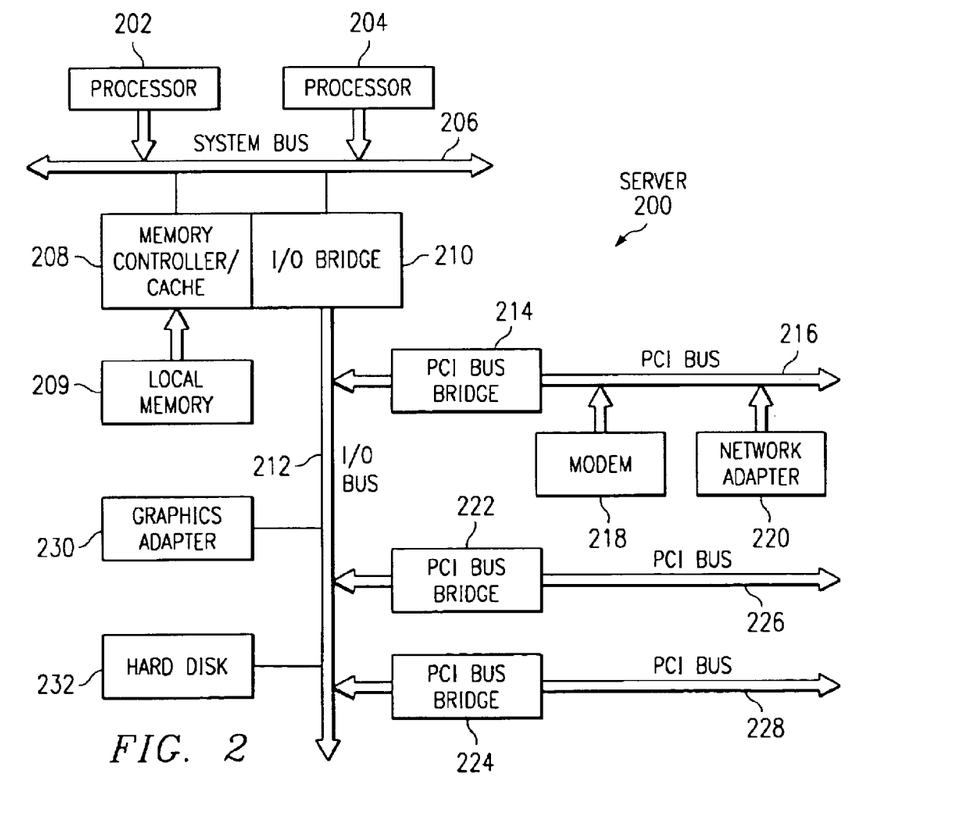
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, New York, running the Advanced Interactive Executive (AIX) operating system.

Figure 3:
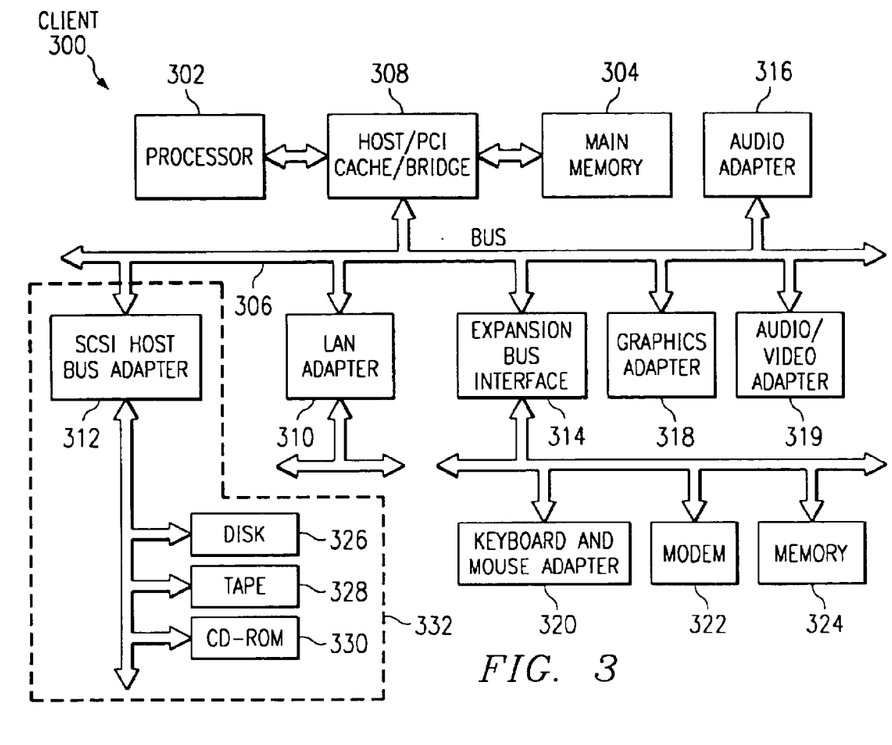
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections, to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI)

host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer implemented instructions for managing and presenting changes to an object being presented. The user input for the changes are received at a first program while the changes to the object are presented by a second program. In the depicted examples, programs are applets with the first applet in a first instance of a browser and the second applet in a second instance of the browser. The first applet receives the user input, while the second applet presents changes to an object based on the input received at the first applet. The input may take various forms, such as, for example, a changed parameter for a graphical object or a query for a search. If the change is a parameter for the graphical object, the second applet may process the parameter locally at the client system and visually change the displayed object. If the input is a query, the second applet may send a search request to a remote host location, receive results, and display the updated search results. These changes occur without having to go from an input page to a display page in the browser. The input graphical user interface provided by the first applet remains while the presentation interface provided by the second applet is present. In this manner a user may enter user input and see the changes or results quickly. Also, the mechanism of the present invention allows for changes or setting to be saved without requiring a cookie being stored on the local data processing system at which the applets are executing. The data may be stored remotely at a server for later use or retrieval.

The data is passed from an applet in one browser window to an applet in another browser window by using a static variable. In programming, a variable is a value that can change, depending on conditions or on information passed to the program. In Java, the "static keyword" is used to indicate that a particular variable is a class variable as opposed to an instance variable. Thus, a static variable, also known as a class variable, has only one copy of the variable associated with a Java class, rather than many copies of the variable associated with each instance of the Java class. Only one copy of the variable exists regardless of the number of instances of the class that are created. The terms static variable and class variable mean the same and can be used interchangeably.

A data type in a programming language is a set of data with values having predefined characteristics. Examples of data types are: integer, floating point number, character, string, and pointer. A class or static variable can have all the data types that an instance variable can have. The 'static' keyword modifier makes the variable a class variable as opposed to an instance variable.

The user input applet is executing in a first window, frame, or instance of a browser. A browser is a program used to view web pages and any associated data. In these examples, the browser is a web browser, such as, for example, Internet Explorer from Microsoft Corporation. A second window is opened. This second window contains an applet, which initially displays an object and subsequently displays changes to that object, by retrieving the user input data from the static variable.

Figure 4:
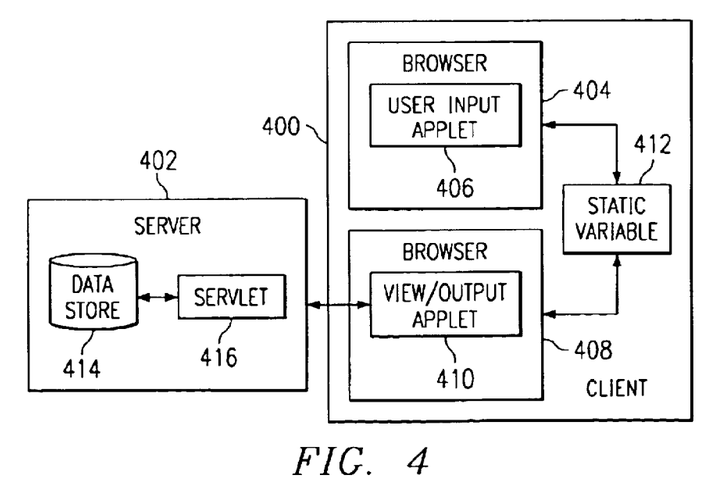
FIG. 4 is a block diagram of components used for managing and displaying dynamic changes to an object in accordance with a preferred embodiment of the present invention.

Turning next to FIG. 4, a block diagram of components used for managing and displaying dynamic changes to an object is depicted in accordance with a preferred embodiment of the present invention. In this example, client 400 is a client to server 402. A browser 404 is displayed within client 400 in which applet 406 is executing. Applet 406 serves as an input applet to receive user input from a user. The results of the input are displayed in browser 408 through applet 410. In this example, applet 410 serves as the presentation applet for presenting changes made to an object through applet 406. The input is passed from applet 406 to applet 41D through a browser memory object taking the form of static variable 412.

In these examples, applet 406 and applet 410 are downloaded from server 402 through a request to servlet 416. Browser 404 and browser 408 are browser windows, which are instances of a browser program in these examples.

A user may modify various attributes of an object through the interface provided by applet 406 in browser 404. The user is able to visually see changes applied to the object as presented by applet 410 in browser 408. The initial launching of browser 408 is performed by applet 406 in browser 404. From that point forward, two browser windows are open each associated with a Java applet in these examples. Applet 406 is used to make changes to the property of an object while applet 410 presents updates or changes to the object. In this manner, a user is able to make changes to various attributes of an object and have those changes quickly presented.

For example, a customer may modify attributes of an item that the customer desires to purchase. For example, with an automobile, the model, color, interior, and other options may be changed in applet 406 and have those changes reflected in the presentation by applet 410.

In another example, a user may perform a search for documents. The user may enter a query in applet 406 in which this Graphical User Interface (GUI) applet aids the user in selecting and creating a query. The object presented is a search results list, which is presented by applet 410 in this example. Using this mechanism, the user may see both the search and the search results list simultaneously. In this manner, the user may make changes in applet 406 and see those results presented by applet 410.

In these examples, the objects are graphical objects. Of course, the user input may modify other types of objects, such as, for example, an audio file. Combinations of object types may be altered and presented using the mechanism of the present invention.

Further, users may desire to save their work or data. In such a case, users often do not like having cookies being stored on their systems. A cookie is data created by a Web server that is stored on a user's computer. It provides a way for the Web site to keep track of a user's patterns and preferences and, with the cooperation of the Web browser, to store them on the user's own hard disk. Cookies contain a range of URLs (addresses) for which they are valid. When the browser encounters those URLs again, it sends those specific cookies to the Web server. For example, if a user's ID were stored as a cookie, it would save that person from typing in the same information all over again when accessing that service for the second and subsequent time. Further, cookies have a size limitation and may not be able to contain all of the data, depending on the complexity of the object being manipulated by the user.

The preferred place to store data for an object is on the host or server, where it may be managed and backed up. Applet 410 may save the data on server 402 within data store 414. Applet 410 may use a program, such as servlet 416, to store the data describing the object in data store 414. In this example, the program takes the form of servlet 416 but may take other forms such as a common gateway interface (CGI) script. At a later time, a user may recall this data from data store 414 from any Java enabled browser and see those properties applied to the object. Thus, a save option may be included in applet 406 to save attribute data at server 402. This mechanism is desirable to users because an unsigned applet is unable to access local client system resources and do not place cookies or other information on the client machine. An alternate design approach is to have applet 406 itself store the object data in data store 414 by using a program such as servlet 416 running on server 402.

Figure 5:
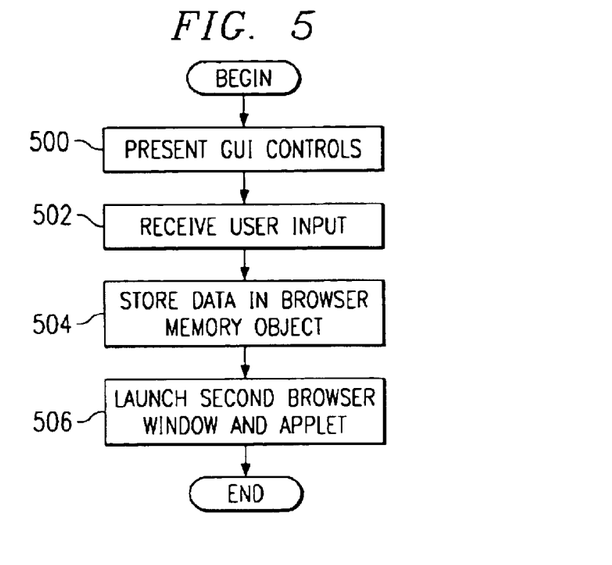
FIG. 5 is a flowchart of a process used to save data to a variable in accordance with a preferred embodiment of the present invention.

Turning next to FIG. 5, a flowchart of a process used to save data to a static variable is depicted in accordance with a preferred embodiment of the present invention. This process is implemented in an applet, such as applet 406 in FIG. 4. This process is employed the first time an applet used to receive input is run.

The process begins by presenting graphical user interface (GUI) controls in the browser (step 500). Thereafter, user input is received (step 502). This user data is then stored in a browser memory object (step 504). In these examples, the browser memory object is a static or class variable. Thereafter, a second browser window and an applet are launched (step 506) with the process terminating thereafter.

Figure 6:
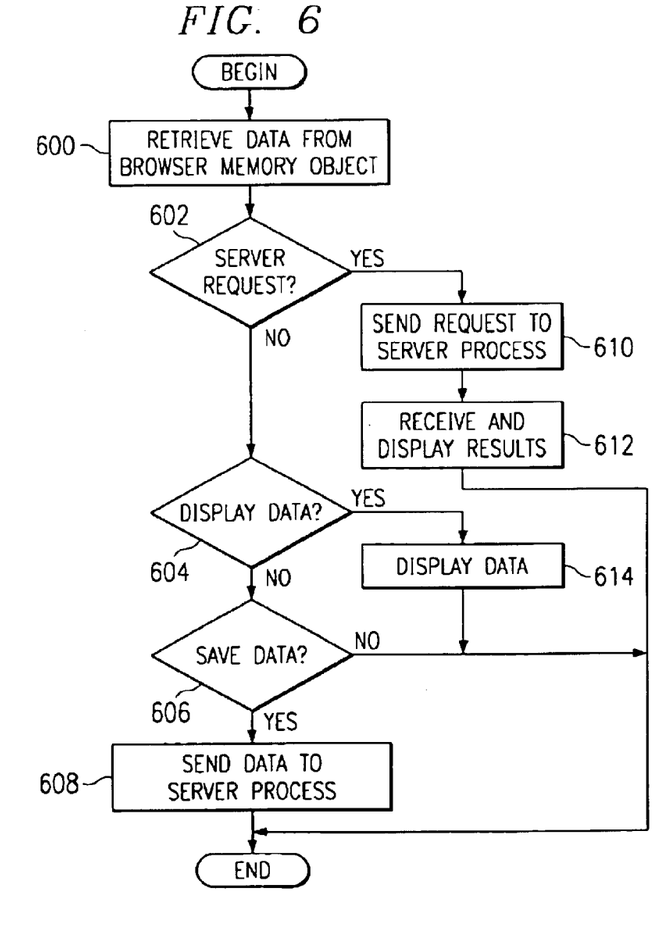
FIG. 6 is a flowchart of a process used to retrieve data from a browser memory object in accordance with a preferred embodiment of the present invention.

With reference now to FIG. 6, a flowchart of a process used to retrieve data from a browser memory object is depicted in accordance with a preferred embodiment of the present invention. The process depicted in FIG. 6 may be implemented in applet 410 in FIG. 4.

The process begins by retrieving data from the browser memory object (step 600). Next, a determination is made as to whether a server request has been made (step 602). In this example, the request is for a search using a query retrieved from the browser memory object. If a request has not been made, a determination is made as to whether the data should be displayed (step 604). If data is not to be displayed, a determination is made as to whether the data should be saved (step 606). If it is indeed determined that the data should be saved, the data is sent to the server process (step 608), with the process terminating thereafter.

Returning now to step 602, if a host request has been made, the request is sent to the server process (step 610), the results are received and displayed (step 612), with the process terminating thereafter. Referring again to step 604, if it is determined that the data should be displayed, the data is displayed (step 614), and the process is complete. Finally, with reference again to step 606, if a decision is made not to save the data, the process terminates.

In FIG. 6, the process illustrated handles data that may take the form of a search query, data for display, or data for storage. Of course, other manipulations of data retrieved from the browser memory object may occur depending on the particular implementation.

Figure 7:
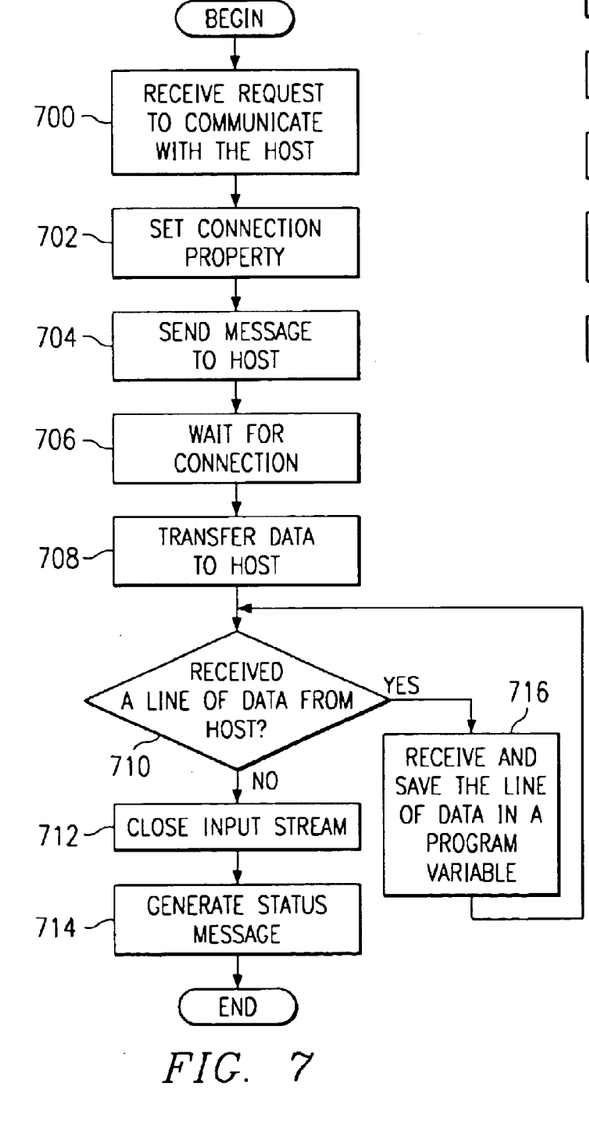
FIG. 7 is a flowchart of a process used to transfer data in an applet in accordance with a preferred embodiment of the present invention.

Turning next to FIG. 7, a flowchart of a process used to transfer data in an applet is depicted in accordance with a preferred embodiment of the present invention. In FIG. 7, the illustrated processes may be implemented in an applet, such as applet 410 in FIG. 4. This process is used in these examples to save data about an object being manipulated by the user. In this manner, a user may later retrieve the data to view the object. As a result, signed applets and cookies are not required on the client system.

The process begins by receiving a request to communicate with the host (step 700). This host is the host originating the applet. The request is typically initiated by a user input requesting an action requiring the applet to communicate with the host in which data is exchanged with the host. Next, a connection property is set in a message to be sent to the host (step 702). This message is one that is used to simulate a request by a browser for a connection. In these examples, a connection property of a multipurpose internet mail extension (MIME) content-type header field is set as follows: "Content-Type", "application/x-www-form-urlencoded". This content-type header field is used to specify the type and subtype of data in the body of a message as well as to fully specify the encoding of this data. This message is used to open a URL connection to a CGI script program. A CGI script is a small program written in a language such as Perl, Tcl, C or C++ that functions as the glue between HTML pages and other programs on the Web server.

Next, the formatted message is sent to the host (step 704). Optionally, the "path info" or "query string" can be used for tacking on data to the end of the URL string. Some servers, however, limit the size of URL string to 255 bytes. As a result of this size limitation, only a small amount of data can be sent in this manner. Also, if a connection cannot be successfully established, it is not possible for the client to know if the data in "query string" made it to the server. So, in the depicted examples, the bulk of the data will not be sent as "query string", but instead the data will be sent to the server as outlined in step 708, after a successful connection is established with the server.

Next, the applet then waits for a connection to be established with the host (step 706).

After the connection is established, data transfer from the applet to host occurs (step 708). Next, data is received, a line at a time, from the server. A determination is made as to whether another line of data is present for receipt from the server (step 710). When all the data from the host is received by the applet, the applet closes its input stream (step 712). For example, the applet may create an output stream and send the data to the CGI script using this output stream. The output stream is closed after data has been written to the output stream. This method is similar to data that is POST'ed to a server when an HTML FORM is submitted at a website. Additionally, the data transfer may include receiving data, which involves creating an input stream, receiving the data from the CGI script using the input stream, and closing the input stream after all the data has been read from the host by the applet.

Thereafter, a status message for the user is generated and displayed (step 714) with the process terminating thereafter. In this example, this message is used to confirm the success or failure of the data transfer. The success or failure may be identified through predefined return codes established with the CGI script during the data transfer.

With reference again to step 710, if additional data is present for receipt from the server, the line of data is received and saved in a program variable (step 716) with the process then returning to step 710 as described above.

Figure 8:
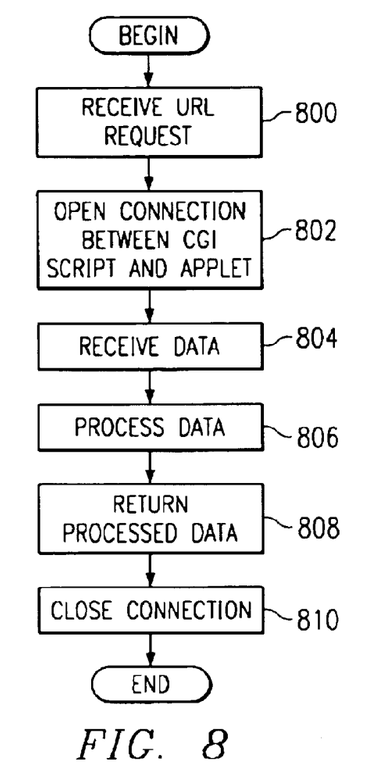
FIG. 8 is a flowchart of a process used for handling a data transfer at a host in accordance with a preferred embodiment of the present invention.

With reference now to FIG. 8, a flowchart of a process used for handling a data transfer at a host is depicted in accordance with a preferred embodiment of the present invention. The process illustrated in FIG. 8 may be implemented in a program, such as servlet 416 in FIG. 4. This process may be implemented in various other programs on the server or host, such as a CGI script.

The process begins by receiving a URL request (step 800). Thereafter, a connection is opened between the CGI script and the applet on the client (step 802). In this example, the applet is applet 410 in FIG. 4. Data is received from the applet (step 804). The received data is then processed (step 806), which may involve storing or retrieving data from a backend database, and the processed data is returned to the applet (step 808). Thereafter, the connection is closed (step 810) with the process terminating thereafter. This data transfer may take place, for example, using an output stream and/or an input stream as described above with reference to FIG. 7. The client, in this case the applet, always initiates and opens a connection to a server. The connection is closed when the CGI script sends the request back to the client and then terminates its execution process on the host.

Figure 9:
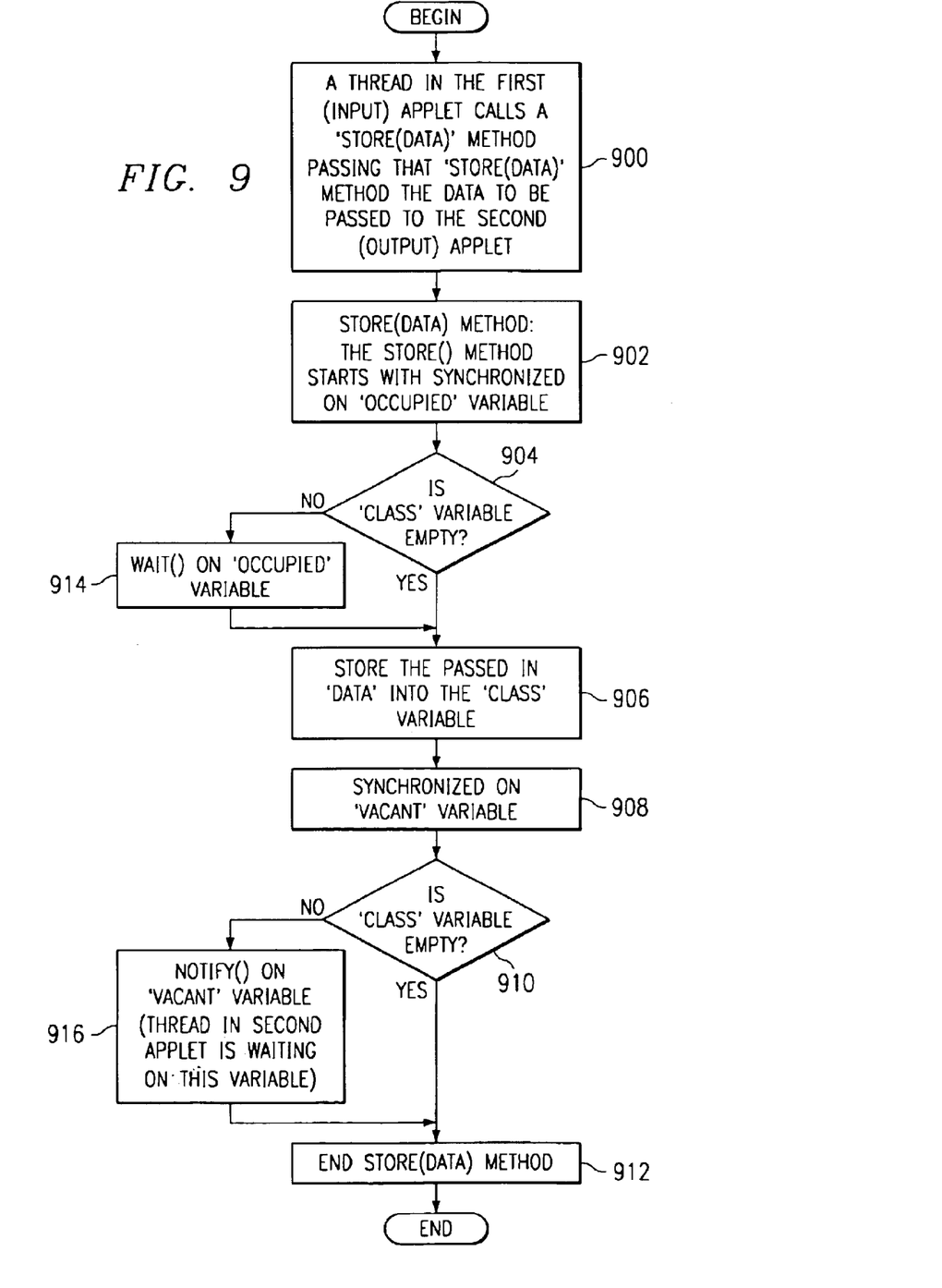
FIG. 9 is a flowchart of a process used by the first (user input) Java applet for synchronizing data in FIG. 10 in accordance with a preferred embodiment of the present invention.

Turning next to FIG. 9, a flowchart of a process used for synchronizing data is depicted in accordance with a preferred embodiment of the present invention. The process illustrated in FIG. 9 may be implemented in applet 406 in FIG. 4 to synchronize data in applet 410 in FIG. 4. This process is used to place data in a static variable and to notify applet 410 that data is present in the static or class variable.

The process begins when a thread in the first applet calls a 'store(data)' method passing that 'store(data)' method the data to be passed to the second applet (step 900). Java allows implementation of synchronization as depicted in this store method and the retrieve method in FIG. 10, by using Java primitives such as the synchronized keyword, and the wait( ), and the notify( ) methods.

Figure 10:
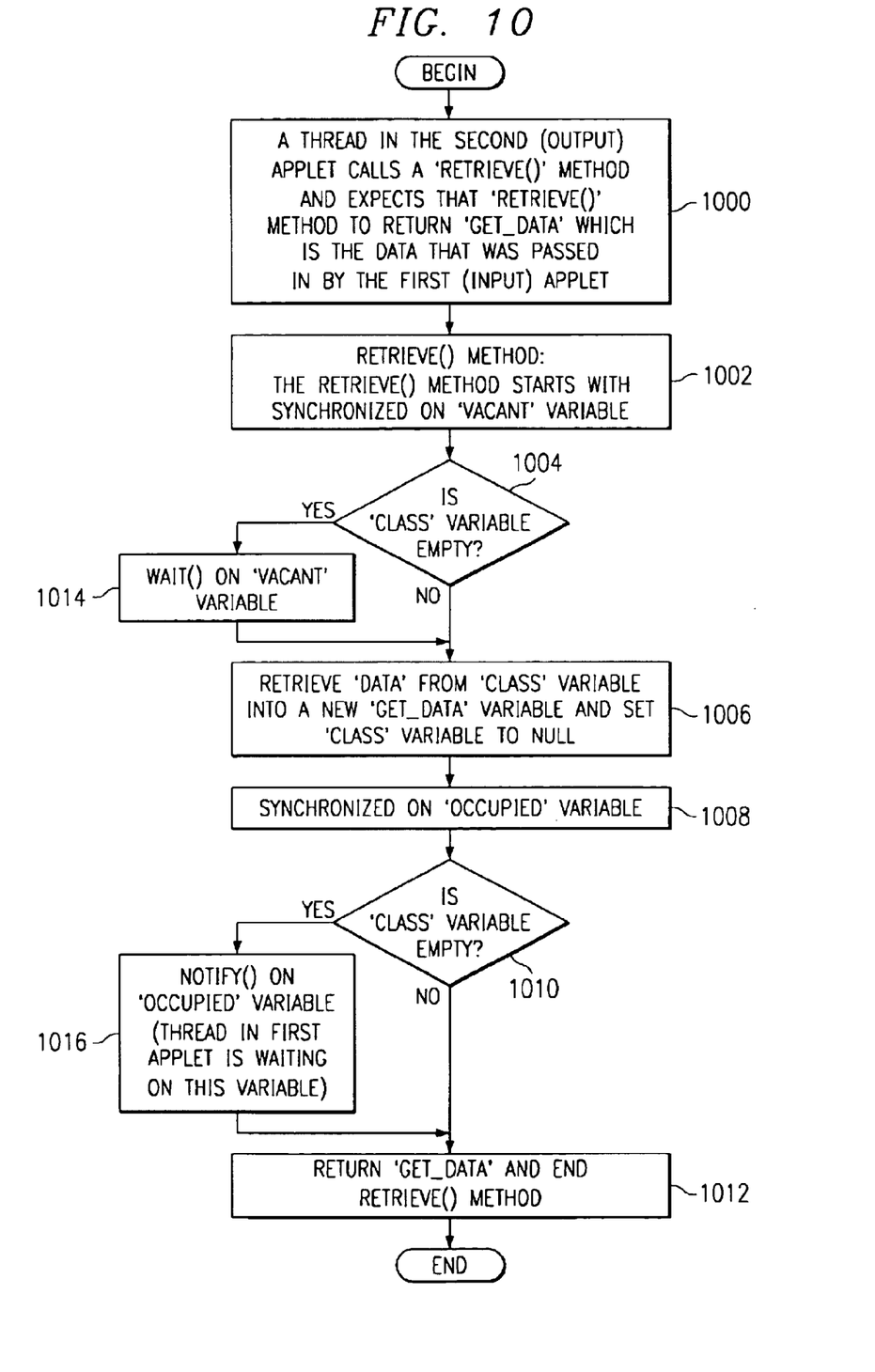
FIG. 10 is a flowchart of a process used by the second (view output) Java applet for synchronizing data in FIG. 9 in accordance with a preferred embodiment of the present invention.

The first applet is a user input applet, such as applet 406 in FIG. 4, while the second applet is a view output applet such as applet 410 in FIG. 4. The store( ) method starts with a synchronized on 'occupied' variable (step 902). Step 902 involves the concept of a Java language construct called a "monitor". All Java objects have a monitor. Only one thread can be executing within a monitor at a time. Another thread trying to enter a monitor, which already contains a thread, will be blocked, until the first thread leaves the monitor. A thread enters a monitor of an object by calling the synchronized method on that object. So, in this case the thread running the code for the store( ) method enters the monitor of the 'occupied' variable by invoking the synchronized method on the 'occupied' variable. The Java code for this step looks like:
Synchronized (occupied)
{
.
.
.
}

The terms "occupied" and "vacant" are selected to represent two variables. These names reflect the status of data in the class variable. "Occupied" means, data in the class variable has been put in by the first thread and is ready to be read by the second thread. "Vacant" means, data in the class variable has been read by the second thread, and the class variable is now null. So the class variable is now ready to accept new data from the first thread. Basically, this synchronization prevents race condition between the 2 threads. This synchronization makes sure that the first thread should wait and not change the data (in the class variable) before the second thread has had a chance to read that data. This synchronization also makes sure that the second thread should wait and only read valid data (from the class variable) after that data has been written by the first thread and is ready to be read. Additionally, this synchronization scheme also makes sure that threads go to sleep and are only awakened when there is work to do; which is contrasted by a looping scheme that constantly checks for work to do thereby consuming all the CPU cycles resulting in performance degradation of the client system.

Next, a determination is made as to whether the 'class' variable is empty (step 904). If the 'class' variable is empty, the passed in 'data' is stored into the 'class' variable (step 906). After this occurs, the 'vacant' variable is synchronized (step 908). A determination is made as to whether the 'class' variable is empty (step 910). If the 'class' variable is empty, the store(data) method ends (step 912), and the process is complete.

Referring back to step 904, if the 'class' variable is not empty, then the thread goes to sleep by calling the wait( ) method on the 'occupied' variable (step 914). This thread wakes up from its sleep when the other thread in FIG. 10, calls the notify( ) method of the 'occupied' variable (step 1016 in FIG. 10). Next, the passed data in 'data' is stored into the 'class' variable (step 906), and the process continues as outlined above.

With reference again to step 910, if the 'class' variable is not empty, the notify( ) method of the 'vacant' variable is called (step 916). The effect of this step is, to wake up the other thread described in FIG. 10, which is sleeping on the wait( ) method of the 'vacant' variable (step 1014 in FIG. 10). The objective of step 916 is to notify the output applet, that data is present in the 'class' variable and can be retrieved by waking up and proceeding on to step 1006. Step 916, causes the thread in the output applet to wake up, and go from step 1014 to step 1006 as explained above. Next, the store(data) method ends (step 912), with the process terminating thereafter.

Turning finally to FIG. 10, a flowchart of a process used for synchronizing data is depicted in accordance with a preferred embodiment of the present invention. The process illustrated in FIG. 10 is used in an output applet, such as applet 410 in FIG. 4 to retrieve data from a class variable when data is placed into the class variable by an input applet, such as applet 406 in FIG. 4.

The process begins by a thread in the second (Output) applet calling a 'retrieve( )' method and expecting that 'retrieve( )' method to return 'get_data', which is the data that was passed in by the first (input) applet (step 1000). Next, the retrieve( ) method starts with a synchronized on 'vacant' variable (step 1002).

Thereafter, a determination is made as to whether the 'class' variable is empty (step 1004). If the 'class' variable is not empty, the retrieve 'data' from the 'class' variable into a new 'get_data' variable is made, and the 'class' variable is set to null (step 1006). This step is used to retrieve data from the 'class' variable. After this step takes place, the 'occupied' variable is synchronized on (step 1008).

Next, a determination is made as to whether the 'class' variable is empty (step 1010). If the 'class' variable is not empty, 'get_data' is returned, and the retrieve( ) method ends (step 1012). The process terminates thereafter.

Returning now to step 1004, if the 'class' variable is empty, the process initiates a wait( ) method on the 'vacant' variable (step 1014). The process then proceeds to step 1006 as described above.

Returning to step 1010, if the 'class' variable is empty, a notify( ) method is initiated on the 'occupied' variable (step 1016) with the process then proceeding to step 1012 as described above. Step 1016, executed by a thread in the second applet, wakes up the thread in the first applet in step 914.

Thus, the present invention provides a method, apparatus, and computer implemented instructions for presenting dynamic changes to an object using an input program and an output program. The mechanism of the present invention avoids having to accept signed Java applets or cookies in a browser, reducing concerns about unauthorized access to client resources. Unsigned Java applets do not have access to resources on a client machine because the security manager of the browser prevents this access. Further, some processing that normally occurs on the server, such as processing of changes on a graphical object in response to user input, is moved to the client machine. This arrangement also increases the performance of an application. Further, by storing data at the server, data management burdens are removed from the user. Additionally, a user may access the application and data from any client browser at any location. This access is provided since data is not stored locally as a cookie.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system presenting changes to data, the method comprising:

receiving a user input to modify at least one attribute of an object through an input applet in a first instance of a browser;

placing the user input in a static variable;

retrieving the user input from the static variable through a presentation applet in a second instance of the browser;

processing, by the presentation applet, the user input to form a result by applying changes to a property of the object;

presenting the result in the second instance of the browser; and displaying simultaneously both the user input in the first instance of a browser and the result in the second instance of the browser.

2. The method of claim 1, wherein the user input is an input changing display characteristics of a graphical object being displayed in the second instance of the browser.

3. The method of claim 1, wherein the user input is a search query.

4. The method of claim 1, wherein the static variable is a class variable.

5. The method of claim 1 further comprising:

saving data from the second instance of the browser in a remote data processing system in response to a selected user received by the first instance of the browser.

6. The method of claim 1, wherein the result is at least one of text, a graphical object, and a sound file.

7. The method of claim 1, wherein the user input is a query and wherein the processing step comprises:

sending the query to a server; and receiving a result.

8. The method of claim 1, wherein the user input is a change to a graphical object being displayed in the second instance of the browser and wherein the processing step comprises:

altering a display of the graphical object in the second instance of the browser using the user input.

9. A method in a data processing system for presenting data, the method comprising:

displaying a first graphical user interface for receiving through an input applet in a first instance of a browser a user input to modify at least one attribute of an object;

placing the user input in a static variable in response to receiving the user input;

retrieving the user input from the static variable through a presentation applet in a second instance of the browser;

processing, by the presentation applet, the user input to form a result by applying changes to a property of the object;

presenting the result in a second graphical user interface in the second instance of the browser; and displaying simultaneously both the user input in the first graphical user interface and the result in the second graphical user interface.

10. A data processing system for presenting data, the data processing system comprising:
an input applet in a first instance of a browser, wherein the input applet displays a first graphical user interface to receive a user input to modify at least one attribute of an object and places the user input in a static variable; and
a presentation applet in a second instance of a browser, wherein the presentation applet retrieves the user input from the static variable, processes the user input to form a result by applying changes to a property of the object, and presents the result in a second graphical user interface in the second instance of a browser simultaneously with the user input in the first graphical user interface in the first instance of a browser.

11. The data processing system of claim 10, wherein the first graphical user interface is a first instance of a browser and wherein the second graphical user interface is a second instance of the browser.

12. The data processing system of claim 10, wherein the user input is one of a search query or a command.

13. A data processing system presenting changes to data, the data processing system comprising:
receiving means for receiving a user input to modify at least one attribute of an object through through an input applet in a first instance of a browser;
placing means for placing the user input in a static variable;
retrieving means for retrieving the user input from the static variable through a presentation applet in a second instance of the browser;
processing means for processing, by the presentation applet, the user input to form a result by applying changes to a property of the object;
presenting means for presenting the result in the second instance of the browser; and
displaying means for displaying simultaneously both the user input in the first instance of a browser and the result in the second instance of the browser.

14. The data processing system of claim 13, wherein the user input is an input changing display characteristics of a graphical object being displayed in the second instance of the browser.

15. The data processing system of claim 13, wherein the user input is a search query.

16. The data processing system of claim 13, wherein the static variable is a class variable.

17. The data processing system of claim 13, further comprising:
saving means for saving data from the second instance of the browser in a remote data processing system in response to a selected user received by the first instance of the browser.

18. The data processing system of claim 13, wherein the result is at least one of text, a graphical object, and a sound file.

19. The data processing system of claim 13, wherein the user input is a query and wherein the processing means comprises:
sending means for sending the query to a server; and
receiving means for receiving a result.

20. The data processing system of claim 13, wherein the user input is a change to a graphical object being displayed in the second instance of the browser and wherein the processing means comprises:

altering means for altering a display of the graphical object in the second instance of the browser using the user input.

21. A data processing system for presenting data, the data processing system comprising:
displaying means for displaying a first graphical user interface for receiving through an input applet in a first instance of a browser a user input to modify at least one attribute of an object;
placing means for placing the user input in a static variable in response to receiving the user input;
retrieving means for retrieving the user input from the static variable through a presentation applet in a second instance of the browser;
processing means for processing, by the presentation applet, the user input to form a result by applying changes to a property of the object;
presenting means for presenting the result in a second graphical user interface in the second instance of the browser; and
displaying means for displaying simultaneously both the user input in the first graphical user interface and the result in the second graphical user interface.

22. A computer program product in a computer readable medium for use in presenting changes to data, the computer program product comprising:
first instructions for receiving a user input to modify at least one attribute of an object through an input applet in a first instance of a browser;
second instructions for placing the user input in a static variable;
third instructions for retrieving the user input from the static variable through a presentation applet in a second instance of the browser;
fourth instructions for processing, by the presentation applet, the user input to form a result by applying changes to a property of the object;
fifth instructions for presenting the result in the second instance of the browser; and
sixth instructions for displaying simultaneously both the user input in the first instance of a browser and the result in the second instance of the browser.

23. A computer program product in a computer readable medium for use in presenting data, the computer program product comprising:
first instructions for displaying a first graphical user interface for receiving through an input applet in a first instance of a browser a user input to modify at least one attribute of an object;
second instructions for placing the user input in a static variable in response to receiving the user input;
third instructions for retrieving the user input from the static variable through a presentation applet in a second instance of the browser;
fourth instructions for processing, by a presentation applet, the user input to form a result by applying changes to a property of the object;
fifth instructions for presenting the result in a second graphical user interface is the second instance of the browser; and
sixth instructions for displaying simultaneously both the user input in the first graphical user interface and the result in the second graphical user interface.

* * * * *

UNITED STATES PATENT AND TRADEMARK OFFICE
CERTIFICATE OF CORRECTION

PATENT NO.         : 6,934,734 B2
APPLICATION NO. : 09/730407
DATED               : August 23, 2005
INVENTOR(S)       : Lakhdhir It is certified that error appears in the above-identified patent and that said Letters Patent is hereby corrected as shown below:

Col. 13, line 27: after "object" delete "through".

Signed and Sealed this

Tenth Day of April, 2007

JON W. DUDAS
*Director of the United States Patent and Trademark Office*